(12) United States Patent
Wang

(10) Patent No.: US 12,267,316 B2
(45) Date of Patent: Apr. 1, 2025

(54) COMMUNICATION METHOD AND RELATED PRODUCT

(71) Applicant: Shenzhen Yinwang Intelligent Technologies Co., Ltd., Shenzhen (CN)

(72) Inventor: Yong Wang, Shenzhen (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 217 days.

(21) Appl. No.: 17/848,101

(22) Filed: Jun. 23, 2022

(65) Prior Publication Data

US 2022/0329582 A1 Oct. 13, 2022

Related U.S. Application Data

(63) Continuation of application No. PCT/CN2020/137200, filed on Dec. 17, 2020.

(30) Foreign Application Priority Data

Dec. 23, 2019 (CN) .......................... 201911343068.9

(51) Int. Cl.
*H04L 9/40* (2022.01)
*H04L 9/08* (2006.01)
(Continued)

(52) U.S. Cl.
CPC .................................. *H04L 63/083* (2013.01)

(58) Field of Classification Search
CPC ... H04L 63/083; H04L 9/0838; H04L 9/0866; H04L 9/0827; H04L 2209/84; H04L 9/14; H04L 9/3263; H04L 63/0428; H04L 63/0823; H04L 65/1033; H04L 65/1069; H04L 67/10; H04L 67/14; H04L 69/24;
(Continued)

(56) References Cited

U.S. PATENT DOCUMENTS 6,853,894 B1 2/2005 Kolls
9,365,188 B1 6/2016 Penilla et al.
(Continued)

FOREIGN PATENT DOCUMENTS

CN 106027260 A * 10/2016 ........... H04L 9/3236
CN 107925568 A 4/2018
(Continued)

OTHER PUBLICATIONS

Menezes et al., "Chapter 12: Key Establishment Protocols ED," Handbook of Applied Cryptography, CRC Press, Inc., Series on Discrete Mathematics and its Applications, XP001525012, CRC Press, Boca Raton, FL, US, pp. 489-541, Total 54 pages (Oct. 1, 1996).

*Primary Examiner* — Darren B Schwartz
(74) *Attorney, Agent, or Firm* — Leydig, Voit & Mayer, Ltd.

(57) ABSTRACT

Receiving a first request message from a first apparatus through a first secure channel, where the first request message includes an identifier of an electronic control unit of a vehicle; obtaining a first key based on the identifier and security information of the first secure channel; and establishing a second secure channel with the electronic control unit based on the first key, where the second secure channel is used for communication between a cloud server and the electronic control unit.

20 Claims, 7 Drawing Sheets

(51) Int. Cl.
*H04L 9/14* (2006.01)
*H04L 9/32* (2006.01)
*H04L 65/1033* (2022.01)
*H04L 65/1069* (2022.01)
*H04L 67/10* (2022.01)
*H04L 67/12* (2022.01)
*H04L 67/14* (2022.01)
*H04L 67/141* (2022.01)
*H04L 69/24* (2022.01)
*H04W 12/00* (2021.01)
*H04W 12/03* (2021.01)
*H04W 12/041* (2021.01)
*H04W 12/71* (2021.01)

(58) Field of Classification Search
CPC ... H04L 9/0869; H04L 63/0869; H04L 67/12; H04L 67/141; H04W 12/009; H04W 12/71; H04W 12/03; H04W 12/041
See application file for complete search history.

(56) References Cited

U.S. PATENT DOCUMENTS

| | | |
|---|---|---|
| 2008/0148374 A1 | 6/2008 | Spaur et al. |
| 2013/0111582 A1 | 5/2013 | Forest |
| 2015/0180840 A1* | 6/2015 | Jung .................. H04L 9/3247 713/150 |
| 2016/0035147 A1* | 2/2016 | Huang ................ H04L 9/3271 701/31.4 |
| 2016/0072781 A1 | 3/2016 | Zhang et al. |
| 2016/0344704 A1* | 11/2016 | Stumpf .................. H04L 63/10 |
| 2017/0111177 A1* | 4/2017 | Oguma ................ H04L 9/3273 |
| 2017/0134164 A1* | 5/2017 | Haga .................. G06F 21/445 |
| 2017/0139795 A1* | 5/2017 | Komano .............. H04L 63/1425 |
| 2018/0131524 A1* | 5/2018 | Shin ........................ H04L 9/14 |
| 2018/0183773 A1* | 6/2018 | Nakagawa ........... H04L 63/0428 |
| 2018/0212937 A1* | 7/2018 | Wang ................ H04L 12/40104 |
| 2018/0254903 A1* | 9/2018 | Bardelski ................ G06F 21/72 |
| 2018/0270052 A1* | 9/2018 | Cullen .................. H04L 9/0827 |
| 2019/0028448 A1* | 1/2019 | Farrell ................ H04L 63/062 |
| 2019/0238555 A1* | 8/2019 | Buffard .................. G06F 21/57 |
| 2019/0265965 A1 | 8/2019 | Acharya et al. |
| 2019/0306136 A1* | 10/2019 | David .................. H04L 9/3242 |
| 2020/0169392 A1* | 5/2020 | Ju ........................ H04L 9/0866 |
| 2020/0177398 A1* | 6/2020 | Takemori ............ H04L 63/0823 |
| 2020/0211301 A1* | 7/2020 | Zhang .................. H04L 63/065 |
| 2021/0099292 A1* | 4/2021 | Gilton .................. H04L 9/3247 |

FOREIGN PATENT DOCUMENTS

| | | |
|---|---|---|
| CN | 207504909 U | 6/2018 |
| CN | 109033862 A | 12/2018 |
| CN | 109327307 A | 2/2019 |
| CN | 109361508 A | 2/2019 |
| CN | 109743283 A | 5/2019 |
| CN | 208956085 U | 6/2019 |
| EP | 3285241 A2 | 2/2018 |
| EP | 3334085 A1 | 6/2018 |
| JP | 2012100206 A | 5/2012 |
| JP | 2018107622 A | 7/2018 |
| WO | 2016075869 A1 | 5/2016 |

* cited by examiner

COMMUNICATION METHOD AND RELATED PRODUCT

CROSS-REFERENCE TO RELATED APPLICATIONS

This application is a continuation of International Application No. PCT/CN2020/137200, filed on Dec. 17, 2020, which claims priority to Chinese Patent Application No. 201911343068.9, filed on Dec. 23, 2019. The disclosures of the aforementioned applications are hereby incorporated by reference in their entireties.

TECHNICAL FIELD

This application relates to the field of vehicle communications technologies, and in particular, to a communication method and a related product.

BACKGROUND

In many scenarios, components of a vehicle need to securely communicate with a cloud server. The components of the vehicle include a telematics box, a gateway, and another electronic control unit. Certificates are usually configured for the telematics box and the gateway. When securely communicating with a cloud, the telematics box or the gateway may use a certificate to complete identity authentication, and establish a transport layer security (TLS) secure channel with the cloud server. When securely communicating with the cloud, the electronic control unit (ECU) of the vehicle also needs to establish a TLS secure channel with the cloud server based on a certificate. Consequently, certificate configuration occupies storage resources of the ECU, and a certificate configuration process also increases production costs of the ECU. In addition, some ECUs cannot be configured with certificates.

SUMMARY

Embodiments of this application provide a communication method and a related product, to implement secure communication between an electronic control unit and a cloud server, and also save storage resources of the electronic control unit.

According to a first aspect, a communication method is provided. The method may be implemented by a cloud server, or may be implemented by a processing chip on the cloud server. For ease of description, an example in which the cloud server performs the method is used in this embodiment for description. In the method, the cloud server receives a first request message sent by an information processing unit through a first secure channel, where the first request message includes an identifier of an electronic control unit of a vehicle. Further, the cloud server obtains a first key based on the identifier and security information of the first secure channel. Then, the cloud server establishes a second secure channel with the electronic control unit based on the first key, where the second secure channel is used for communication between the cloud server and the electronic control unit.

Correspondingly, according to a second aspect, a communication method is further provided. The method may be implemented by an information processing unit, or may be implemented by a processing chip on the information processing unit. For ease of description, an example in which the information processing unit performs the method is used in this embodiment for description. In the method, the information processing unit sends a first request message to a cloud server through a first secure channel, where the first request message includes an identifier of an electronic control unit of a vehicle. The information processing unit obtains a first key based on the identifier and security information of the first secure channel. Further, the information processing unit sends the first key to the electronic control unit, where the first key is used by the electronic control unit to establish a second secure channel with the cloud server. It should be noted that a sequence of the steps is not limited in this embodiment.

Correspondingly, according to a third aspect, a communication method is further provided. The method may be implemented by an electronic control unit, or may be implemented by a processing chip on the electronic control unit. For ease of description, an example in which the electronic control unit performs the method is used in this embodiment for description. In the method, the electronic control unit sends a first request message to an information processing unit, where the first request message includes an identifier of the electronic control unit. Further, the electronic control unit receives a first key sent by the information processing unit, where the first key is obtained by the information processing unit based on the identifier and security information of a first secure channel, and the first secure channel is used for communication between a cloud server and the information processing unit. The electronic control unit establishes a second secure channel with the cloud server based on the first key, where the second secure channel is used for communication between the cloud server and the electronic control unit.

In the foregoing solution, when the cloud server needs to establish a secure channel with the electronic control unit, the cloud server may obtain the first key based on the security information of the first secure channel between the cloud server and the information processing unit, and establish, with the electronic control unit based on the first key, the second secure channel between the cloud server and the electronic control unit, so that the cloud server and the electronic control unit can securely communicate with each other. In such a solution, no certificate needs to be pre-configured for the electronic control unit, that is, the electronic control unit does not need to pre-store a certificate, so that storage resources of the electronic control unit can be saved, and costs of an electronic control unit manufacturer or a vehicle manufacturer can also be reduced.

Optionally, that the cloud server establishes a second secure channel with the electronic control unit based on the first key includes: The cloud server generates a communication key based on the first key, where the communication key is used to encrypt data sent by the cloud server to the electronic control unit or to decrypt data received from the electronic control unit. Correspondingly, that the electronic control unit establishes a second secure channel with the cloud server based on the first key includes: The electronic control unit generates a communication key based on the first key, where the communication key is used to encrypt data sent to the cloud server or to decrypt data received from the cloud server.

In this way, the cloud server and the electronic control unit establish the second secure channel based on the communication key obtained by using the first key, so that the first secure channel can be isolated from the second secure channel, to reduce impact on the second secure channel when security of the first secure channel is affected.

Optionally, before the cloud server receives the first request message sent by the information processing unit through the first secure channel, the method further includes: The cloud server verifies a certificate of the information processing unit; and establishes the first secure channel with the information processing unit when the certificate is valid.

Optionally, before the information processing unit sends the first request message to the cloud server through the first secure channel, the method further includes: The information processing unit verifies a certificate of the cloud server. The information processing unit establishes the first secure channel with the cloud server when the certificate is valid.

According to the foregoing optional solution, the cloud server verifies the certificate of the information processing unit and/or the information processing unit verifies the certificate of the server, so that security of the first secure channel can be ensured. In this embodiment of this application, the second secure channel between the electronic control unit and the cloud server is also established based on the security information of the first secure channel. Therefore, security of the first secure channel is ensured, and security of the second secure channel can also be improved.

In some embodiments, before the cloud server receives the first request message sent by the information processing unit through the first secure channel, the method further includes: The cloud server negotiates a session key with the information processing unit, and establishes the first secure channel with the information processing unit based on the session key, where the session key is used to encrypt data sent to the information processing unit or to decrypt data received from the information processing unit. Correspondingly, before the information processing unit sends the first request message to the cloud server through the first secure channel, the method further includes: The information processing unit negotiates a session key with the cloud server, and the information processing unit establishes the first secure channel with the cloud server based on the session key, where the session key is used to encrypt data sent to the cloud server or to decrypt data received from the cloud server. In this way, the information processing unit can establish the first secure channel with the cloud server without a pre-configured certificate, so that storage resources of the information processing unit can be saved, and costs of an information processing unit manufacturer or a vehicle manufacturer can also be reduced.

In this way, the information processing unit can establish the first secure channel with the cloud server without a pre-configured certificate, so that storage resources of the information processing unit can be saved, and costs of an information processing unit manufacturer or a vehicle manufacturer can also be reduced.

In some embodiments, the information processing unit is a telematics box or a vehicle gateway. Because the information processing unit or the telematics box is connected to a plurality of electronic control units of the vehicle, the electronic control unit can send the first request message to the cloud server through the first secure channel between the information processing unit and the cloud server, to establish the second secure channel with the cloud server.

In some embodiments, the electronic control unit is a vehicle control unit of the vehicle, a microcontroller unit of the vehicle, or a body control module of the vehicle. In this way, the second secure channel can be established between the vehicle control unit of the vehicle, the microcontroller unit of the vehicle, or the body control module of the vehicle and the cloud server.

According to a fourth aspect, an embodiment of this application provides a cloud server, including:
 a transceiver module, configured to receive a first request message sent by an information processing unit through a first secure channel, where the first request message includes an identifier of an electronic control unit of a vehicle; and
 a processing module, configured to: obtain a first key based on the identifier and security information of the first secure channel; and establish a second secure channel with the electronic control unit based on the first key, where the second secure channel is used for communication between the cloud server and the electronic control unit.

In this way, when the cloud server needs to establish a secure channel with the electronic control unit, the cloud server may obtain the first key based on the security information of the first secure channel between the cloud server and the information processing unit, and establish the second secure channel with the electronic control unit based on the first key. In such a solution, no certificate needs to be pre-configured for the electronic control unit, so that storage resources of the electronic control unit can be saved, and costs of an electronic control unit manufacturer or a vehicle manufacturer can also be reduced.

In an embodiment, the processing module is specifically configured to establish the second secure channel in the following manner:
 generating a communication key based on the first key, where the communication key is used to encrypt data sent by the cloud server to the electronic control unit or to decrypt data received from the electronic control unit.

In an embodiment, the processing module is further configured to:
 verify a certificate of the information processing unit; and
 establish the first secure channel with the information processing unit when the certificate is valid.

In an embodiment, the processing module is further configured to:
 negotiate a session key with the information processing unit by using the transceiver module; and
 establish the first secure channel with the information processing unit based on the session key, where the session key is used to encrypt data sent to the information processing unit or to decrypt data received from the information processing unit.

It should be noted that technical effects of the communication method according to the first aspect are also applicable to the cloud server in this embodiment. To avoid repetition, details are not described herein again.

According to a fifth aspect, an embodiment of this application further provides an information processing unit, including:
 a sending unit, configured to send a first request message to a cloud server through a first secure channel, where the first request message includes an identifier of an electronic control unit of a vehicle; and
 a processing unit, configured to obtain a first key based on the identifier and security information of the first secure channel.

The sending unit is further configured to send the first key to the electronic control unit, where the first key is used by the electronic control unit to establish a second secure channel with the cloud server.

In this way, when the electronic control unit needs to establish a secure channel with the cloud server, the information processing unit may obtain the first key based on the security information of the first secure channel between the cloud server and the information processing unit, and send the first key to the electronic control unit. In this way, the electronic control unit can establish the second secure channel with the cloud server based on the first key. In such a solution, no certificate needs to be pre-configured for the electronic control unit, so that storage resources of the electronic control unit can be saved, and costs of an electronic control unit manufacturer or a vehicle manufacturer can also be reduced.

In an embodiment, the processing unit is further configured to:

negotiate a session key with the cloud server by using the sending unit; and establish the first secure channel with the cloud server based on the session key, where the session key is used to encrypt data sent to the cloud server or to decrypt data received from the cloud server.

In an embodiment, the processing unit is further configured to:

verify a certificate of the cloud server; and establish the first secure channel with the cloud server when the certificate is valid.

It should be noted that technical effects of the communication method according to the second aspect are also applicable to the information processing unit in this embodiment. To avoid repetition, details are not described herein again.

According to a sixth aspect, an embodiment of this application further provides an electronic control unit, including:

a sending unit, configured to send a first request message to an information processing unit, where the first request message includes an identifier of the electronic control unit;

a receiving unit, configured to receive a first key sent by the information processing unit, where the first key is obtained by the information processing unit based on the identifier and security information of a first secure channel, and the first secure channel is used for communication between a cloud server and the information processing unit; and a processing unit, configured to establish a second secure channel with the cloud server based on the first key, where the second secure channel is used for communication between the cloud server and the electronic control unit.

In this way, when the electronic control unit needs to establish a secure channel with the cloud server, the electronic control unit may send the first request message that includes the identifier of the electronic control unit to the information processing unit, and send the first request message to the cloud server through the first secure channel established between the information processing unit and the cloud server. In this way, the electronic control unit can receive, from the information processing unit, the first key obtained by the information processing unit based on the security information of the first secure channel and the identifier of the electronic control unit, and establish the second secure channel with the cloud server based on the first key. In such a solution, no certificate needs to be pre-configured for the electronic control unit, so that storage resources of the electronic control unit can be saved, and costs of an electronic control unit manufacturer or a vehicle manufacturer can also be reduced.

In some embodiments, the processing unit specifically establishes the second secure channel in the following manner:

generating a communication key based on the first key, where the communication key is used to encrypt data sent by the electronic control unit to the cloud server or to decrypt data received by the electronic control unit from the cloud server.

It should be noted that technical effects of the communication method according to the third aspect are also applicable to the electronic control unit in this embodiment. To avoid repetition, details are not described herein again.

According to a seventh aspect, an embodiment of this application further provides a device, and the device includes a processor and a memory. The memory stores computer instructions, and the processor executes the computer instructions stored in the memory, so that the device performs the communication method according to any implementation of the first aspect.

According to an eighth aspect, an embodiment of this application further provides a device, and the device includes a processor and a memory. The memory stores computer instructions, and the processor executes the computer instructions stored in the memory, so that the device performs the communication method according to any implementation of the second aspect.

According to a ninth aspect, an embodiment of this application further provides a device, and the device includes a processor and a memory. The memory stores computer instructions, and the processor executes the computer instructions stored in the memory, so that the device performs the communication method according to any implementation of the third aspect.

According to a tenth aspect, an embodiment of this application further provides a vehicle, including the device according to the eighth aspect and the device according to the ninth aspect.

According to an eleventh aspect, an embodiment of this application further provides a computer-readable storage medium. The computer-readable storage medium is configured to store executable program code of a device, and the program code is executed by the device, to implement the communication method according to any implementation of the first aspect, the communication method according to any implementation of the second aspect, or the communication method according to any implementation of the third aspect.

The foregoing embodiment may further include the following optional solutions.

Optionally, the information processing unit may be, for example, a telematics box or a vehicle gateway. The electronic control unit may be, for example, a vehicle control unit, a microcontroller unit, or a body control module of the vehicle. However, this embodiment is not limited thereto. Because the information processing unit or the telematics box is connected to a plurality of electronic control units of the vehicle, the electronic control unit can send the first request message to the cloud server through the first secure channel between the information processing unit and the cloud server, to establish the second secure channel with the cloud server.

Optionally, the security information includes a session key of the first secure channel. In this way, after the cloud server establishes the first secure channel with the information processing unit, the cloud server may obtain the first key based on the session key of the first secure channel and the identifier of the electronic control unit, and establish a secure channel with the electronic control unit of the vehicle based on the first key, to implement secure communication between the electronic control unit and the cloud server.

Optionally, the security information further includes at least one of the following information: an identifier of the cloud server, a session identifier of the first secure channel, or an identifier of the information processing unit. In this way, calculation complexity of the first key can be increased, and security of communication between the electronic control unit and the cloud server can be ensured.

BRIEF DESCRIPTION OF DRAWINGS

To describe technical solutions in embodiments of this application or the conventional technology more clearly, the following briefly describes the accompanying drawings used in descriptions of embodiments.

DESCRIPTION OF EMBODIMENTS

The following describes technical solutions of this application with reference to the accompanying drawings.

Figure 1:
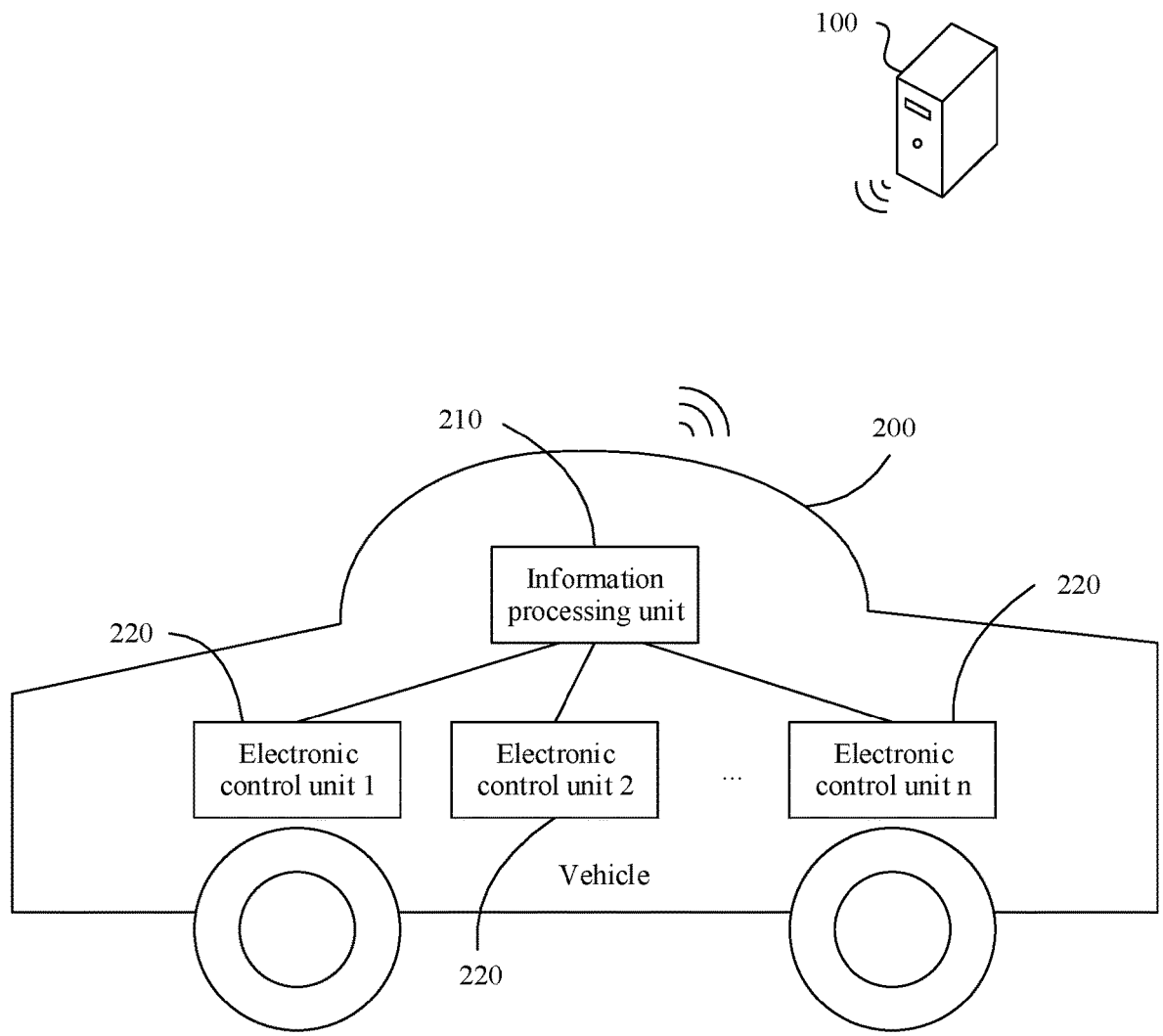
FIG. 1 is a schematic diagram of a network architecture of a communications system according to an embodiment of this application.

FIG. 1 is a schematic diagram of a network architecture of a communications system according to an embodiment of this application. The communications system includes a cloud server 100 and a vehicle 200. The vehicle 200 in this embodiment of this application may be but is not limited to a fuel vehicle, an electric vehicle, a two-wheeled vehicle, a three-wheeled vehicle, or the like. The vehicle 200 includes an information processing unit 210 and one or more electronic control units 220. The information processing unit 210 and the electronic control unit 220 may communicate with the cloud server 100 in a wireless communication manner. The information processing unit 210 is a data exchange hub that can perform data transmission with each electronic control unit 220 of the vehicle 200. The information processing unit 210 may be, for example, but is not limited to, a telematics box (T-BOX) or a vehicle gateway. The electronic control unit 220 is an electronic controller that is of the vehicle and that has a processing or control capability. The vehicle 200 may include one or more electronic control units 220. For example, the vehicle 200 in FIG. 1 includes a plurality of electronic control units 220: an electronic control unit 1, an electronic control unit 2, . . . , and an electronic control unit n. The electronic control unit may be, for example, but is not limited to, a vehicle control unit (VCU), a microcontroller unit (MCU), or a body control module (BCM) of the vehicle.

The transport layer security (TLS) protocol is a security protocol used to provide privacy and data integrity between two communication applications. TLS is a protocol established above TCP at a transport layer and serves an application layer. When two communication parties need to perform secure communication according to TLS, the two communication parties first agree on a supported latest TLS protocol version number and a supported encryption algorithm set. Then, the two communication parties verify a certificate. After verifying the certificate, the two communication parties agree on a communication key, and communicate with each other based on the communication key.

Figure 2:
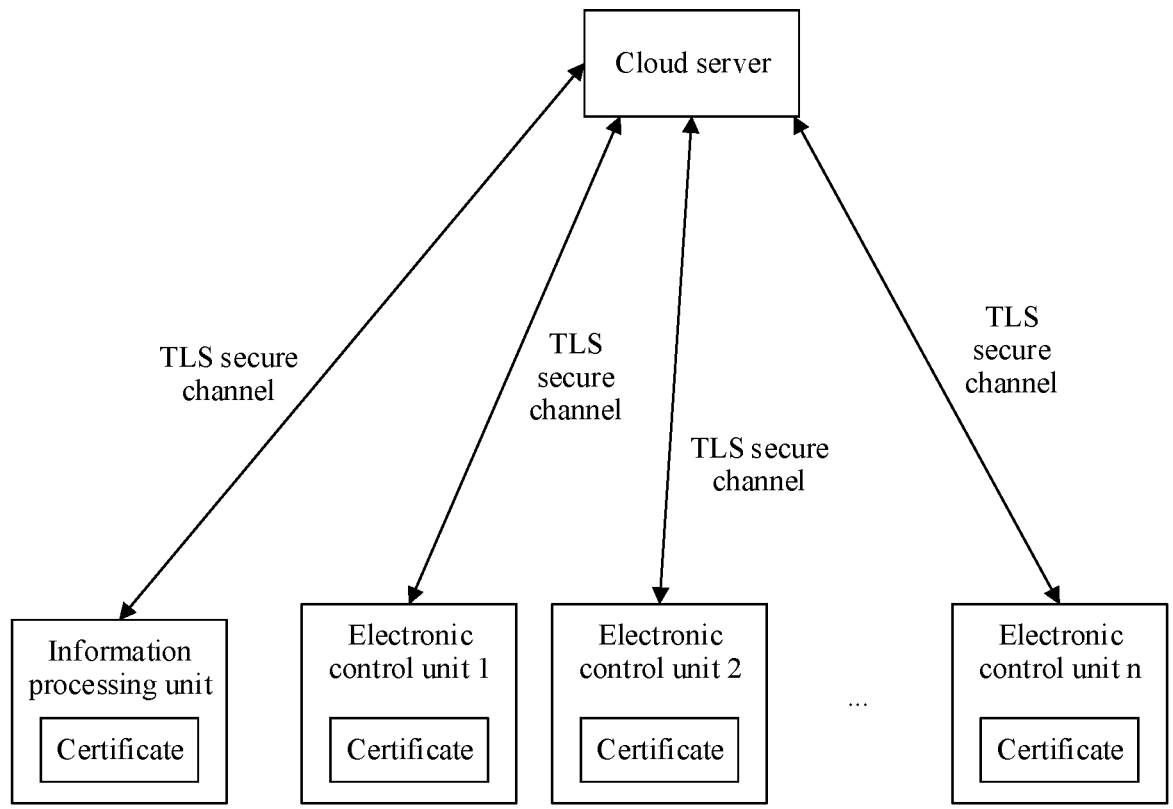
FIG. 2 is a schematic diagram of a network structure of a communications system.

To ensure security of communication between the information processing unit and the cloud server, the information processing unit may establish a secure channel with the cloud server according to TLS, so that the information processing unit communicates with the cloud server through the secure channel. When the information processing unit establishes the secure channel with the cloud server according to TLS, a certificate needs to be pre-configured for the information processing unit. After verifying the certificate of the information processing unit, the cloud server establishes the secure channel with the information processing unit. Similarly, the electronic control unit of the vehicle may also establish a secure channel with the cloud server according to TLS, so that the electronic control unit communicates with the cloud server through the secure channel. Therefore, when the electronic control unit establishes the secure channel with the cloud server based on TLS, a certificate also needs to be pre-configured for the electronic control unit. When the vehicle includes a plurality of electronic control units that need to communicate with the cloud server, a certificate needs to be pre-configured for each electronic control unit, so that each electronic control unit can establish a secure channel with the cloud server according to TLS, and communicate with the cloud server through the established secure channel. For example, as shown in FIG. 2, when an electronic control unit 1 needs to securely communicate with a cloud server, the electronic control unit 1 establishes a TLS secure channel with the cloud server based on a certificate pre-configured for the electronic control unit 1. When an electronic control unit 2 needs to securely communicate with the cloud server, the electronic control unit 2 establishes a TLS secure channel with the cloud server based on a certificate pre-configured for the electronic control unit 2. When an electronic control unit n needs to securely communicate with the cloud server, the electronic control unit n establishes a TLS secure channel with the cloud server based on a certificate pre-configured for the electronic control unit n. It can be learned that, if the plurality of electronic control units communicate with the cloud server according to TLS, the certificate needs to be pre-configured for each of the plurality of electronic control units. Consequently, certificate pre-configuration increases costs of a manufacturer, and certificate pre-configuration also occupies storage resources of the electronic control unit.

A generic bootstrapping architecture (GBA) is an authentication mechanism. Two communication parties can use the GBA to obtain a shared key agreed on by the two parties.

Figure 3:
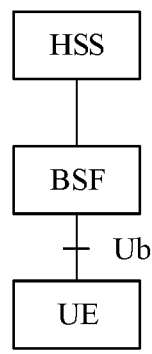
FIG. 3 is a schematic diagram of an architecture of a GBA.

Specifically, FIG. 3 is a schematic diagram of an architecture of a GBA. The GBA includes a bootstrapping server function (BSF), user equipment (UE), a network application function (NAF), and a home subscriber server (HSS). The BSF serves as a hub and interacts with the UE through a Ub interface to implement authentication between the UE and the BSF. Specifically, a shared key may be negotiated between the UE and the BSF based on the GBA. A shared key negotiation process based on the GBA may be as follows: The UE first sends an identifier of the UE to the BSF; the BSF forwards the identifier of the UE to the HSS; and the HSS determines, based on the identifier of the UE, a root key corresponding to the identifier of the UE, and calculates an authentication vector (AV), where AV= (RAND, AUTN, CK, IK, XRES), the RAND is a random number, the AUTN is an authentication token, the CK is a cipher key, the IK is an integrity key, and the XRES is an expected user response. The HSS sends the AV to the BSF; the BSF sends the RAND and the AUTN in the AV to the UE; and the UE verifies the AUTN and calculates the CK, the IK, and a RES, where the RES is a user response. The BSF compares the XRES and the RES to verify whether the RES is correct. If the RES is correct, the BSF calculates Ks=CK∥IK. The BSF sends a B-TID and a key lifetime to the UE. The BSF generates the B-TID based on the RAND and a BSF server name. The UE calculates Ks=CK∥IK. In this way, key negotiation is completed between the UE and the BSF, and the shared key Ks is obtained.

Figure 4:
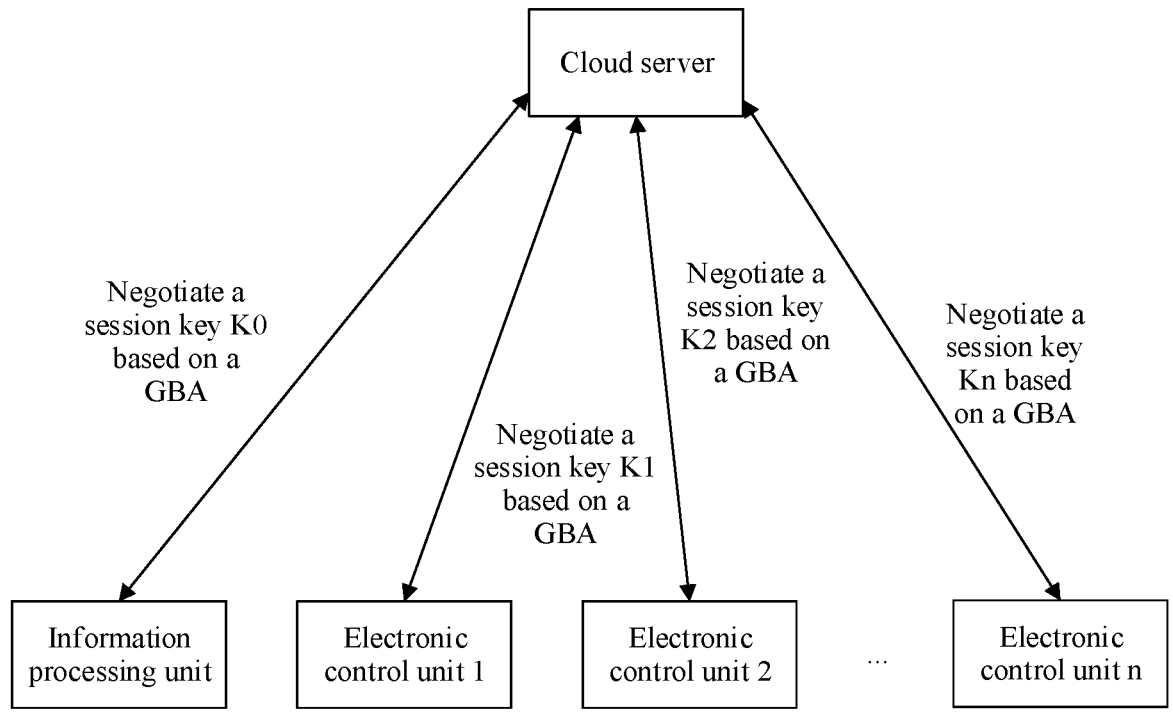
FIG. 4 is a schematic diagram of another network architecture of a communications system.

When the information processing unit needs to securely communicate with the cloud server, the information processing unit may serve as the UE in the GBA, and the cloud server may serve as the BSF in the GBA. In this case, the information processing unit and the cloud server may negotiate a shared key based on the GBA by using the foregoing shared key negotiation process, and use the shared key obtained through negotiation as a session key. Then, the information processing unit communicates with the cloud server based on the session key, to ensure security of communication between the information processing unit and the cloud server. FIG. 4 is a schematic diagram of another network architecture of a communications system. When the information processing unit needs to securely communicate with the cloud server, the information processing unit and the cloud server first negotiate a session key K0 based on the GBA. Then, the information processing unit communicates with the cloud server based on the negotiated session key K0. When the electronic control unit needs to communicate with the cloud server, the electronic control unit may serve as the UE in the GBA, and the cloud server may serve as the BSF in the GBA. In this case, the electronic control unit and the cloud server may negotiate a shared key based on the GBA by using the foregoing shared key negotiation process, and use the shared key as a session key. Then, the electronic control unit securely communicates with the cloud server based on the session key. Still refer to FIG. 4. When the vehicle includes a plurality of electronic control units (for example, an electronic control unit 1 to an electronic control unit n in FIG. 4) that need to communicate with the cloud server, each of the plurality of electronic control units and the cloud server need to negotiate a session key based on the GBA. Then, each electronic control unit securely communicates with the cloud server based on the session key negotiated by each electronic control unit and the cloud server. When the electronic control unit 1 needs to securely communicate with the cloud server, the electronic control unit 1 and the cloud server first negotiate a session key K1 based on the GBA, and then the electronic control unit 1 securely communicates with the cloud server based on the negotiated session key K1. When the electronic control unit 2 needs to securely communicate with the cloud server, the electronic control unit 2 and the cloud server also need to first negotiate a session key K2 based on the GBA, and then the electronic control unit 2 securely communicates with the cloud server based on the negotiated key K2. When the electronic control unit n needs to securely communicate with the cloud server, the electronic control unit n and the cloud server also need to first negotiate a session key Kn based on the GBA, and then the electronic control unit 2 securely communicates with the cloud server based on the negotiated key Kn. It can be learned that, when the plurality of electronic control units all need to securely communicate with the cloud server, each of the plurality of electronic control units and the cloud server need to negotiate a session key once in the foregoing shared key negotiation manner based on the GBA, and the foregoing shared key negotiation process based on the GBA is complex. Consequently, a process in which each electronic control unit of the vehicle securely communicates with the cloud server is complex.

Figure 5:
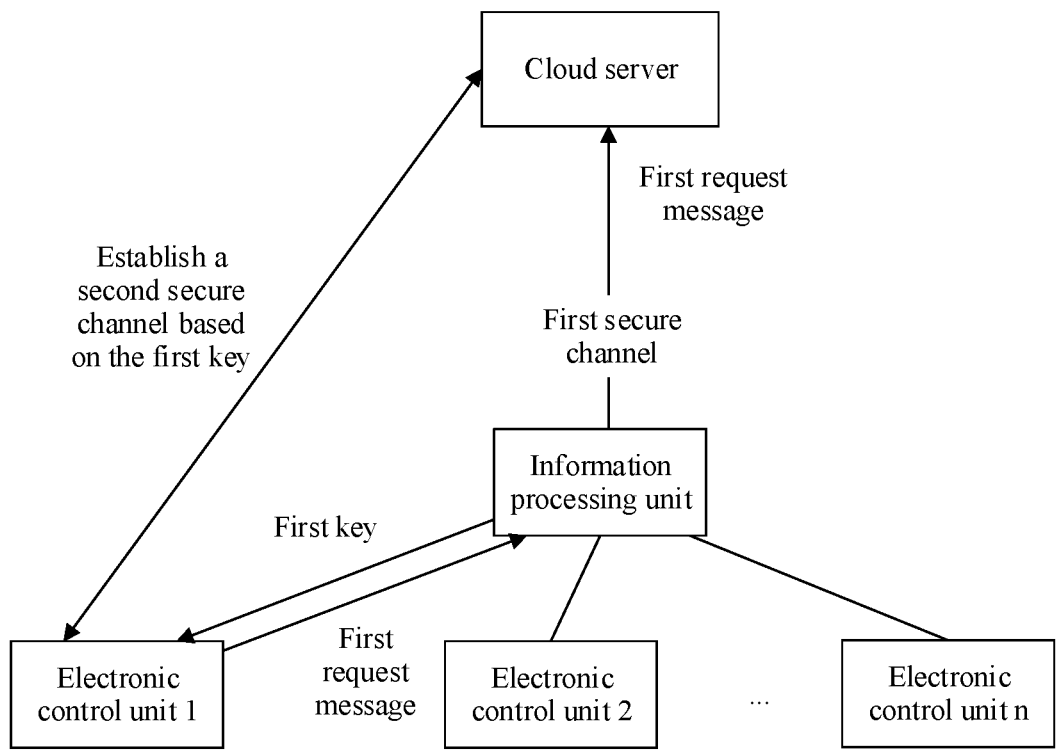
FIG. 5 is a schematic diagram of a network architecture related to a communication method according to an embodiment of this application.

Embodiments of this application provide a communication method. The communication method includes: An electronic control unit of a vehicle sends a first request message to an information processing unit, where the first request message includes an identifier of the electronic control unit. The information processing unit sends the first request message to a cloud server through a first secure channel. The cloud server obtains a first key based on the identifier of the electronic control unit and security information of the first secure channel. The information processing unit obtains the first key based on the identifier of the electronic control unit and the security information of the first secure channel. The information processing unit sends the first key to the electronic control unit. The cloud server and the electronic control unit establish a second secure channel based on the first key. The second secure channel is used for communication between the cloud server and the electronic control unit. In this way, the electronic control unit may communicate with the cloud server through the second secure channel, to ensure security of communication between the electronic control unit and the cloud server. FIG. 5 is a schematic diagram of a network architecture related to a communication method according to an embodiment of this application. In the network architecture shown in FIG. 5, a first secure channel is established between a cloud server and an information processing unit. An electronic control unit 1 may send a first request message that includes an identifier of the electronic control unit 1 to the information processing unit. The information processing unit obtains a first key based on the identifier of the electronic control unit 1 and security information of the first secure channel, and sends the first key to the electronic control unit 1. The information processing unit also sends the first request to the cloud server. The cloud server obtains the first key based on the identifier of the electronic control unit 1 and the security information of the first secure channel. Then, the electronic control unit 1 establishes a second secure channel with the cloud server based on the first key. Similarly, if an electronic control unit 2 needs to securely communicate with the cloud server, the electronic control unit 2 may also establish a secure channel with the cloud server in the foregoing manner in which the electronic control unit 1 establishes the secure channel with the cloud server, and perform secure communication through the secure channel.

In this way, in the process in which the electronic control unit establishes, with the cloud server, the second secure channel for communication, if the information processing unit and the cloud server establish the first secure channel, the information processing unit and the cloud server may obtain the first key based on the security information of the first secure channel and the identifier of the electronic control unit. The information processing unit sends the first key to the electronic control unit. The electronic control unit may establish the second secure connection to the cloud server based on the first key. In this process, no certificate needs to be pre-configured for the electronic control unit, so that storage resources of the electronic control unit can be saved. Because a certificate pre-configuration process is omitted, production costs of the electronic control unit can also be reduced. The electronic control unit and the cloud server do not need to negotiate a session key based on a GBA, so that a process of implementing secure communication between the electronic control unit and the cloud server is simpler.

Figure 6:
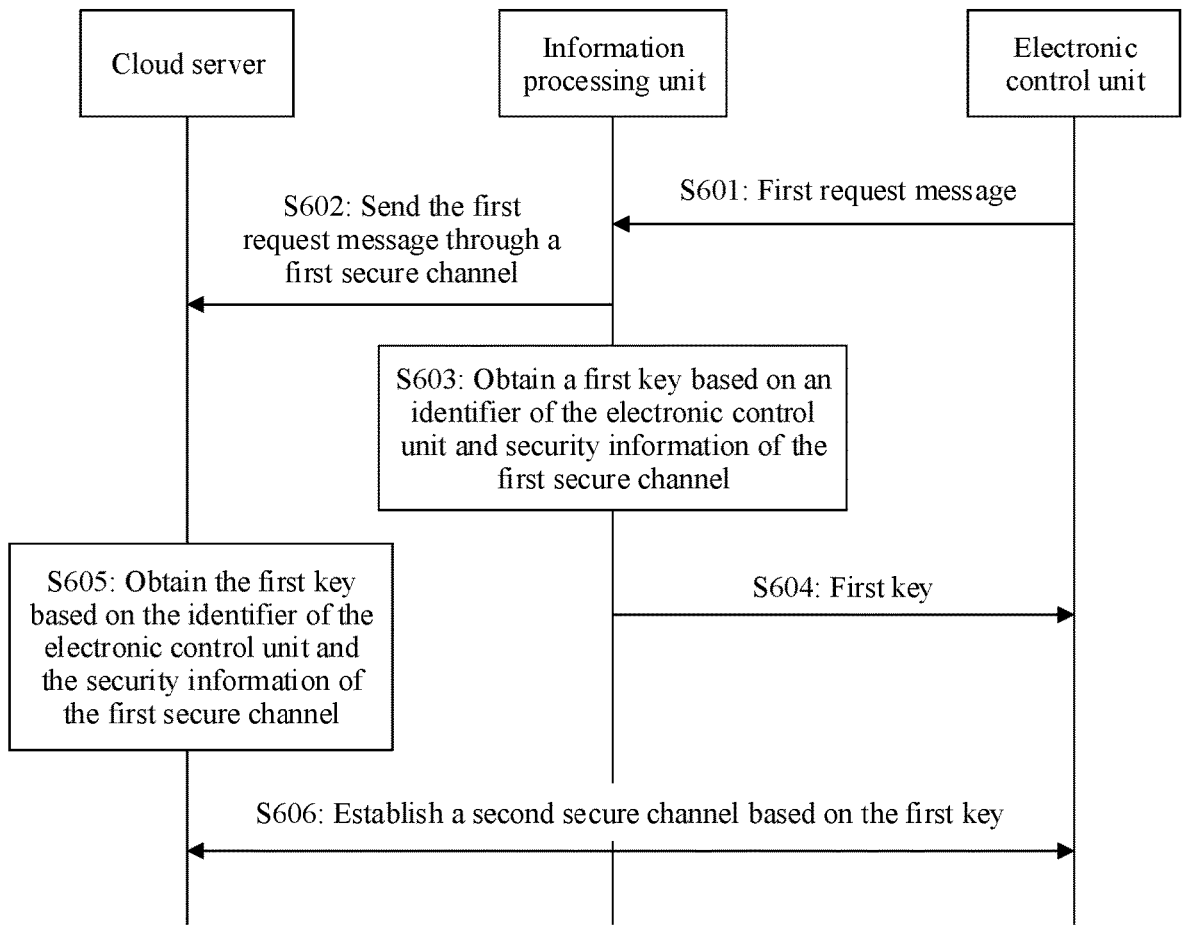
FIG. 6 is a schematic flowchart of a communication method according to an embodiment of this application.

FIG. 6 is a schematic flowchart of a communication method according to an embodiment of this application. The communication method may include the following steps.

S601: An electronic control unit sends a first request message to an information processing unit, where the first request message includes an identifier of the electronic control unit.

When the electronic control unit needs to securely communicate with a cloud server, the electronic control unit may send the first request message to the information processing unit. The first request message is used to request the electronic control unit to securely communicate with the cloud server.

The information processing unit may be, for example, but is not limited to, a telematics box or a vehicle gateway. The electronic control unit may be, for example, but is not limited to, a vehicle control unit, a microcontroller unit, or a body control module of a vehicle.

S602: The information processing unit sends the first request message to the cloud server through a first secure channel.

After receiving the first request message sent by the electronic control unit, the information processing unit sends the first request message to the cloud server through the first secure channel. The first secure channel is a secure channel between the information processing unit and the cloud server. The first secure channel is used for communication between the information processing unit and the cloud server. The first secure channel is established before the information processing unit sends the first request message to the cloud server.

S603: The information processing unit obtains a first key based on the identifier of the electronic control unit and security information of the first secure channel.

The information processing unit processes the identifier of the electronic control unit and the security information of the first secure channel by using a first key derivation algorithm agreed on by the information processing unit and the cloud server, to obtain the first key. The information processing unit and the cloud server may agree on the first key derivation algorithm in advance. For example, the first key derivation algorithm may be HMAC-SHA256, HMAC-MD5, or the like.

S604: The information processing unit sends the first key to the electronic control unit.

For example, the information processing unit may send the first key to the electronic control unit according to an intra-vehicle network security protection mechanism. For example, the information processing unit may send the first key to the electronic control unit according to internet protocol security (IPsec) or TLS. In this way, the first key can be prevented from being stolen, and security of communication between the cloud server and the electronic control unit can be ensured.

S605: The cloud server receives the first request message, and obtains the first key based on the security information of the first secure channel and the identifier of the electronic control unit in the first request message.

The cloud server obtains the identifier of the electronic control unit from the first request message. The cloud server processes the identifier of the electronic control unit and the security information of the first secure channel by using the first key derivation algorithm agreed on by the information processing unit and the cloud server, to obtain the first key.

S606: The electronic control unit establishes a second secure channel with the cloud server based on the first key, where the second secure channel is used for communication between the electronic control unit and the cloud server.

According to the communication method in this embodiment of this application, the cloud server and the information processing unit obtain the first key based on the first security information of the first secure channel between the cloud server and the information processing unit. After the information processing unit sends the first key to the electronic control unit, the electronic control unit may establish the second secure channel with the cloud server based on the first key. The electronic control unit implements secure communication with the cloud server based on the second secure channel. When the second secure channel used for secure communication is established between the electronic control unit and the cloud server, no certificate needs to be pre-configured for the electronic control unit, so that storage resources of the electronic control unit can be saved, and costs of an electronic control unit manufacturer or a vehicle manufacturer can also be reduced. In addition, the electronic control unit and the cloud server do not need to negotiate a session key based on a GBA, so that a process of implementing secure communication between the electronic control unit and the cloud server is simplified.

It should be noted that in this embodiment of this application, steps S602, S603, S604, and S605 are not limited to being performed in sequence: S602→S603→S604→S605. Step S605 needs to be performed after step S602. Step S604 needs to be performed after step S603. Step S602 may be performed before or after step S603, or step S602 and step S603 may be performed simultaneously. A specific execution sequence of S602, S603, S604, and S605 is not limited herein.

In some optional embodiments, the security information of the first secure channel includes a session key of the first secure channel. In this way, the cloud server and the information processing unit can obtain the first key based on the session key of the first secure channel. In this way, after the cloud server and the information processing unit establish the first secure channel, the electronic control unit of the vehicle and the cloud server may obtain the first key based on the session key of the first secure channel and the identifier of the electronic control unit, and establish a secure channel between the electronic control unit and the cloud server based on the first key, to implement secure communication between the electronic control unit and the cloud server.

Further, the security information of the first secure channel further includes at least one of the following information: an identifier of the cloud server, a session identifier of the first secure channel, or an identifier of the information processing unit. In this way, calculation complexity of the first key can be increased, and security of communication between the electronic control unit and the cloud server can be ensured.

It may be understood that the security information of the first secure channel may include only the session key of the first secure channel. The information processing unit may obtain the first key based on only the session key of the first secure channel. Alternatively, the security information of the first secure channel may include the identifier of the cloud server and the session key of the first secure channel. Alternatively, the security information of the first secure channel includes the session identifier of the first secure channel and the session key of the first secure channel. Alternatively, the security information of the first secure channel includes the identifier of the information processing unit and the session key of the first secure channel. Alternatively, the security information of the first secure channel includes the identifier of the cloud server, the session identifier of the first secure channel, and the session key of the first secure channel. Alternatively, the security information of the first secure channel includes the identifier of the cloud server, the identifier of the information processing unit, and the session key of the first secure channel. Alternatively, the security information of the first secure channel includes the session identifier of the first secure channel, the identifier of the information processing unit, and the session key of the first secure channel. Alternatively, the security information of the first secure channel includes the identifier of the cloud server, the identifier of the information processing unit, the session identifier of the first secure channel, and the session key of the first secure channel.

According to the foregoing embodiments, in some optional embodiments, before the information processing unit sends the first request message to the cloud server, the cloud server and the information processing unit establish the first secure channel. A manner of establishing the first secure channel may be as follows: The cloud server verifies a certificate of the information processing unit, and the information processing unit verifies a certificate of the cloud service. When the cloud server confirms that the certificate of the information processing unit is valid and the information processing unit confirms that the certificate of the cloud server is valid, the cloud server and the information processing unit establish the first secure channel. Specifically, after the cloud server verifies that the certificate of the information processing unit is valid and the information processing unit verifies that the certificate of the cloud server is valid, the cloud server sends a random number 1 to the information processing unit. The information processing unit sends a random number 2 to the cloud server. Then, the cloud server sends a random number 3 to the information processing unit. The cloud server obtains the session key based on an agreed algorithm, the random number 1, the random number 2, and the random number 3. The information processing unit also obtains the session key based on the agreed algorithm, the random number 1, the random number 2, and the random number 3. In this way, the information processing unit and the cloud server complete agreement on the session key. The first secure channel is established between the cloud server and the information processing unit based on the session key. The cloud server may encrypt data sent to the information processing unit and decrypt data received from the information processing unit, by using the session key. The information processing unit may encrypt data sent to the cloud server and decrypt data received from the cloud server, by using the session key. Optionally, the agreed algorithm may be a key derivation algorithm in the TLS protocol. In this way, the first secure channel between the cloud server and the information processing unit is a TLS secure channel. This ensures security of the first secure channel, that is, more effectively ensures security of communication between the cloud server and the information processing unit. In this embodiment of this application, the second secure channel between the electronic control unit and the cloud server is also established based on the security information of the first secure channel. Therefore, security of the first secure channel is ensured, and security of the second secure channel can also be improved.

Alternatively, a manner of establishing the first secure channel may be as follows: The cloud server and the information processing unit negotiate a session key, and the cloud server and the information processing unit establish the first secure channel based on the session key. The cloud server may encrypt data sent to the information processing unit and decrypt data received from the information processing unit, by using the session key. The information processing unit may encrypt data sent to the cloud server and decrypt data received from the cloud server, by using the session key. Specifically, the cloud server and the information processing unit negotiate the session key in the foregoing shared key negotiation manner based on the GBA. In this way, the information processing unit can establish the first secure channel with the cloud server without a preconfigured certificate, so that storage resources of the information processing unit can be saved, and costs of an information processing unit manufacturer or a vehicle manufacturer can also be reduced.

Further, in some optional embodiments, in step S606, the electronic control unit and the cloud server may obtain a communication key based on the first key. The cloud server and the electronic control unit establish the second secure channel based on the communication key. The communication key is used to encrypt data sent by the cloud server to the electronic control unit, decrypt data received by the cloud server from the electronic control unit, encrypt data sent by the electronic control unit to the cloud server, and decrypt data received by the electronic control unit from the cloud server.

For example, the electronic control unit and the cloud server may process the first key by using an agreed second key derivation algorithm, to obtain the communication key. For example, the electronic control unit generates a random number 4 and encrypts the random number 4 by using the first key. Then, the electronic control unit sends the encrypted random number 4 to the cloud server. The cloud server generates a random number 5 and encrypts the random number 5 by using the first key. Then, the cloud server sends the encrypted random number 5 to the electronic control unit. The electronic control unit generates a random number 6 and encrypts the random number 6 by using the first key. The electronic control unit sends the random number 6 to the cloud server. The electronic control unit decrypts, by using the first key, the random number 5 received from the cloud server, to obtain the decrypted random number 5. The electronic control unit processes the random number 4, the random number 5, and the random number 6 by using the second key derivation algorithm agreed on with the cloud server, to obtain the communication key. The cloud server decrypts, by using the first key, the random number 4 and the random number 6 received from the electronic control unit, to obtain the decrypted random number 4 and the decrypted random number 6. The cloud server processes the random number 4, the random number 5, and the random number 6 by using the agreed second key derivation algorithm, to obtain the communication key.

In this way, when the first secure channel is established between the cloud server and the information processing unit, if the electronic control unit needs to securely communicate with the cloud server, provided that the information processing unit and the cloud server agree on the first key derivation algorithm, and the electronic control unit and the cloud server agree on the second derivation algorithm, the information processing unit and the cloud server can process the security information of the first secure channel and the identifier of the electronic control unit by using the first key derivation algorithm, to obtain the first key. The electronic control unit and the cloud server may process the first key by using the second key derivation algorithm, to obtain the communication key. The electronic control unit may establish the second secure channel with the cloud server based on the communication key. To be specific, the electronic control unit securely communicates with the cloud server based on the communication key.

Optionally, the second key derivation algorithm may be a key derivation algorithm in the TLS protocol. In this way, the electronic control unit may establish a TLS connection to the cloud server based on the first key, to ensure security of communication between the electronic control unit and the cloud server.

In some optional embodiments, in step S606, the electronic control unit and the cloud server may also use the first key as a session key of the second secure channel. The electronic control unit encrypts, by using the first key, data sent to the cloud server, and decrypts, by using the first key, data received from the cloud server. The cloud server encrypts, by using the first key, data sent to the electronic control unit, and decrypts, by using the first key, data received from the electronic control unit. In this way, the first key obtained through derivation based on the security information of the first secure channel and the identifier of the electronic control unit is used as the session key for communication between the electronic control unit and the cloud server. The second secure channel is established between the cloud server and the electronic control unit based on the first key. In this way, a process of establishing the second secure channel between the electronic control unit and the cloud server can be effectively simplified.

Figure 7:
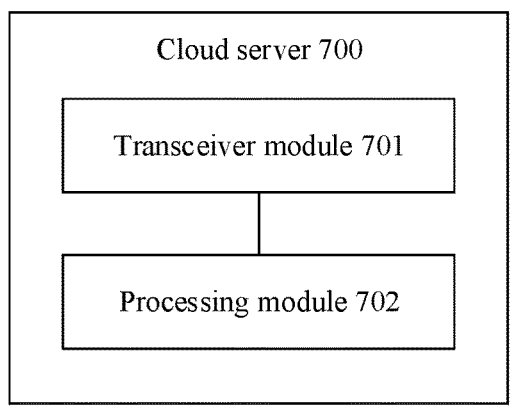
FIG. 7 is a schematic diagram of modules of a cloud server according to an embodiment of this application.

FIG. 7 is a schematic diagram of modules of a cloud server according to an embodiment of this application. An embodiment of this application provides a cloud server 700, including:

a transceiver module 701, configured to receive a first request message sent by an information processing unit through a first secure channel, where the first request message includes an identifier of an electronic control unit of a vehicle; and a processing module 702, configured to: obtain a first key based on the identifier and security information of the first secure channel; and establish a second secure channel with the electronic control unit based on the first key, where the second secure channel is used for communication between the cloud server and the electronic control unit.

In this way, when the cloud server needs to establish a secure channel with the electronic control unit, the cloud server may obtain the first key based on the security information of the first secure channel between the cloud server and the information processing unit, and establish the second secure channel with the electronic control unit based on the first key. In a process of establishing the second secure channel, no certificate needs to be pre-configured for the electronic control unit, so that storage resources of the electronic control unit can be saved, and costs of an electronic control unit manufacturer or a vehicle manufacturer can also be reduced.

In some embodiments, the security information includes a session key of the first secure channel.

In some embodiments, the security information further includes at least one of the following information: an identifier of the cloud server, a session identifier of the first secure channel, or an identifier of the information processing unit.

In some embodiments, the processing module 702 is specifically configured to establish the second secure channel in the following manner:

generating a communication key based on the first key, where the communication key is used to encrypt data sent by the cloud server to the electronic control unit or to decrypt data received from the electronic control unit.

In some embodiments, the processing module 702 is further configured to:

verify a certificate of the information processing unit; and establish the first secure channel with the information processing unit when the certificate is valid.

In some embodiments, the processing module 702 is further configured to:

negotiate a session key with the information processing unit by using the transceiver module 701; and
establish the first secure channel with the information processing unit based on the session key, where the session key is used to encrypt data sent to the information processing unit or to decrypt data received from the information processing unit.

In some embodiments, the information processing unit is a telematics box or a vehicle gateway.

In some embodiments, the electronic control unit is a vehicle control unit, a microcontroller unit, or a body control module of the vehicle.

It should be noted that the descriptions and technical effects of the communication method in the foregoing embodiment are also applicable to the cloud server in this embodiment. To avoid repetition, details are not described herein again.

Figure 10:
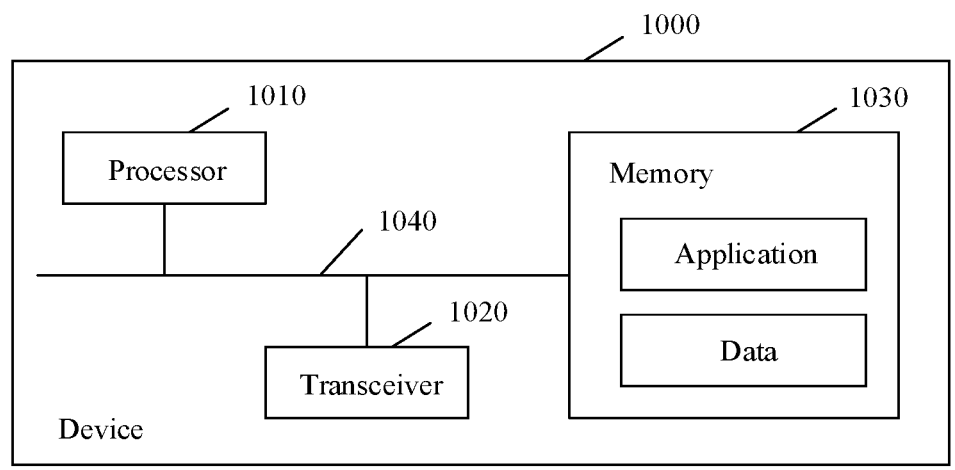
FIG. 10 is a schematic diagram of a structure of a device according to an embodiment of this application.

The cloud server 700 in this embodiment may be implemented by a device 1000 shown in FIG. 10. For example, the transceiver module 701 may be implemented by a transceiver 1020 of the device 1000. The processing module 702 may be implemented by a processor 1010 of the device 1000.

Figure 8:
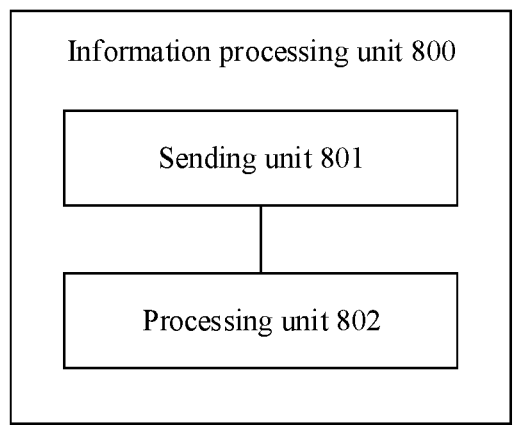
FIG. 8 is a schematic diagram of modules of an information processing unit according to an embodiment of this application.

FIG. 8 is a schematic diagram of modules of an information processing unit according to an embodiment of this application. An embodiment of this application further provides an information processing unit 800, including:

a sending unit 801, configured to send a first request message to a cloud server through a first secure channel, where the first request message includes an identifier of an electronic control unit of a vehicle; and a processing unit 802, configured to obtain a first key based on the identifier and security information of the first secure channel.

The sending unit 801 is further configured to send the first key to the electronic control unit, where the first key is used by the electronic control unit to establish a second secure channel with the cloud server.

In this way, when the electronic control unit needs to establish a secure channel with the cloud server, the information processing unit may obtain the first key based on the security information of the first secure channel between the cloud server and the information processing unit, and send the first key to the electronic control unit. In this way, the electronic control unit can establish the second secure channel with the cloud server based on the first key. In a process of establishing the second secure channel, no certificate needs to be pre-configured for the electronic control unit, so that storage resources of the electronic control unit can be saved, and costs of an electronic control unit manufacturer or a vehicle manufacturer can also be reduced.

In some embodiments, the security information includes a session key of the first secure channel.

In some embodiments, the security information further includes at least one of the following information: an identifier of the cloud server, a session identifier of the first secure channel, or an identifier of the information processing unit.

In some embodiments, the processing unit 802 is further configured to:
negotiate a session key with the cloud server by using the sending unit 801; and
establish the first secure channel with the cloud server based on the session key, where the session key is used to encrypt data sent to the cloud server or to decrypt data received from the cloud server.

Optionally, the information processing unit 800 further includes a receiving unit, and the processor 802 is further configured to negotiate a session key with the cloud server by using the sending unit 801 and the receiving unit.

In some embodiments, the processing unit 802 is further configured to:
verify a certificate of the cloud server; and
establish the first secure channel with the cloud server when the certificate is valid.

In some embodiments, the information processing unit 800 is a telematics box or a vehicle gateway.

In some embodiments, the electronic control unit is a vehicle control unit, a microcontroller unit, or a body control module of the vehicle.

It should be noted that the descriptions and technical effects of the communication method in the foregoing embodiment are also applicable to the information processing unit in this embodiment. To avoid repetition, details are not described herein again.

Figure 11:
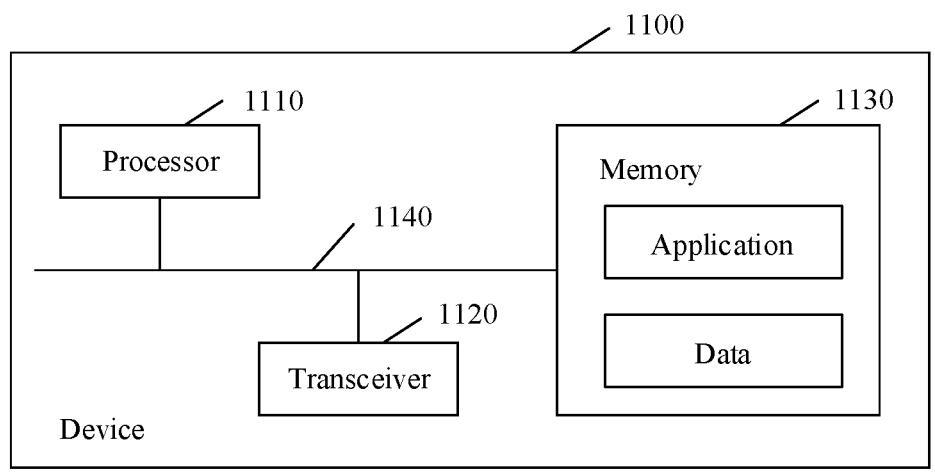
FIG. 11 is a schematic diagram of a structure of another device according to an embodiment of this application.

The information processing unit 800 in this embodiment may be implemented by a device 1100 shown in FIG. 11. For example, the sending unit 801 may be implemented by a sender of a transceiver 1120 of the device 1100. The processing unit 802 may be implemented by a processor 1110 of the device 1100. The receiving unit may be implemented by a receiver of the transceiver 1120 of the device 1100.

Figure 9:
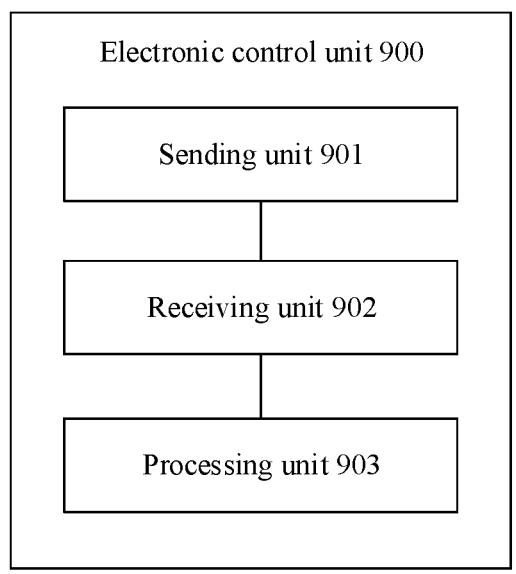
FIG. 9 is a schematic diagram of modules of an electronic control unit according to an embodiment of this application.

FIG. 9 is a schematic diagram of modules of an electronic control unit according to an embodiment of this application. An embodiment of this application further provides an electronic control unit 900, including:
a sending unit 901, configured to send a first request message to an information processing unit, where the first request message includes an identifier of the electronic control unit;
a receiving unit 902, configured to receive a first key sent by the information processing unit, where the first key is obtained by the information processing unit based on the identifier and security information of a first secure channel, and the first secure channel is used for communication between a cloud server and the information processing unit; and
a processing unit 903, configured to establish a second secure channel with the cloud server based on the first key, where the second secure channel is used for communication between the cloud server and the electronic control unit.

In this way, when the electronic control unit needs to establish a secure channel with the cloud server, the electronic control unit may send the first request message that includes the identifier of the electronic control unit to the information processing unit, and send the first request message to the cloud server through the first secure channel established between the information processing unit and the cloud server. In this way, the electronic control unit can receive, from the information processing unit, the first key obtained by the information processing unit based on the security information of the first secure channel and the identifier of the electronic control unit, and establish the second secure channel with the cloud server based on the first key. In a process of establishing the second secure channel, no certificate needs to be pre-configured for the electronic control unit, so that storage resources of the electronic control unit can be saved, and costs of an electronic control unit manufacturer or a vehicle manufacturer can also be reduced.

In some embodiments, the security information includes a session key of the first secure channel.

In some embodiments, the security information further includes at least one of the following information: an identifier of the cloud server, a session identifier of the first secure channel, or an identifier of the information processing unit.

In some embodiments, the processing unit 903 is specifically configured to establish the second secure channel in the following manner:
generating a communication key based on the first key, where the communication key is used to encrypt data sent by the electronic control unit to the cloud server or to decrypt data received by the electronic control unit from the cloud server.

In some embodiments, the information processing unit is a telematics box or a vehicle gateway.

In some embodiments, the electronic control unit 900 is a vehicle control unit, a microcontroller unit, or a body control module of a vehicle.

It should be noted that the technical effects of the communication method in the foregoing embodiment are also applicable to the electronic control unit in this embodiment. To avoid repetition, details are not described herein again.

Figure 12:
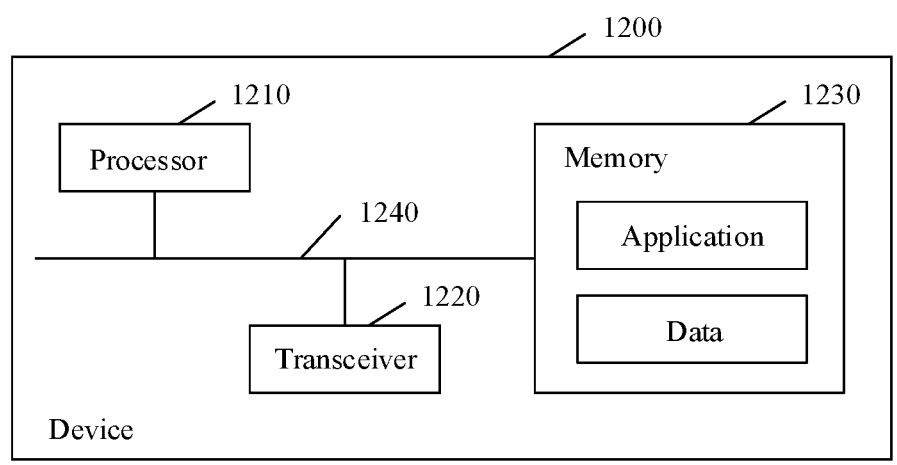
FIG. 12 is a schematic diagram of a structure of still another device according to an embodiment of this application.

The electronic control unit 900 in this embodiment may be implemented by a device 1200 shown in FIG. 12. Specifically, the sending unit 901 may be implemented by a sender of a transceiver 1220 of the device 1200. The receiving unit 902 may be implemented by a receiver of the transceiver 1220 of the device 1200. The processing unit 903 may be implemented by a processor 1210 of the device 1200.

FIG. 10 is a schematic diagram of a structure of a device 1000 according to an embodiment of this application. The device 1000 may be a processing chip in a cloud server. In this case, the device 1000 includes a processor 1010 and an input/output interface. Alternatively, the device 1000 may be a cloud server. In this case, the device 1000 may include a transceiver 1020 and a memory 1030. For example, the processor 1010, the transceiver 1020, and the memory 1030 may be connected to each other through a bus 1040.

The processor 1010 in the device 1000 is configured to read related instructions to perform the following operations:

receiving a first request message sent by an information processing unit through a first secure channel, where the first request message includes an identifier of an electronic control unit of a vehicle;

obtaining a first key based on the identifier and security information of the first secure channel; and establishing a second secure channel with the electronic control unit based on the first key, where the second secure channel is used for communication between the cloud server and the electronic control unit.

For specific implementations of a plurality of operations performed by the foregoing device 1000, refer to specific operations of the cloud server in the foregoing method embodiments. Details are not described herein again. When the device 1000 is the processing chip, the operation of receiving the first request message may be understood as an operation of reading a message through the input/output interface, or may be understood as an operation of demodulating data to obtain content of the first request message.

FIG. 11 is a schematic diagram of a structure of another device 1100 according to an embodiment of this application. The device 1100 may be a processing chip in the information processing unit 210. In this case, the device 1100 includes a processor 1110 and an input/output interface. Alternatively, the device 1100 may be the information processing unit 210. In this case, the device 1100 may include a transceiver 1120 and a memory 1130. For example, the processor 1110, the transceiver 1120, and the memory 1130 may be connected to each other through a bus 1140.

The processor 1110 in the device 1100 is configured to read related instructions to perform the following operations:

sending a first request message to a cloud server through a first secure channel, where the first request message includes an identifier of an electronic control unit of a vehicle;

obtaining a first key based on the identifier and security information of the first secure channel; and sending the first key to the electronic control unit.

For specific implementations of a plurality of operations performed by the foregoing device 1100, refer to specific operations of the information processing unit in the foregoing method embodiments. Details are not described herein again. When the device 1000 is a processing chip, the foregoing sending operation may be understood as an operation of outputting a message or the first key through the input/output interface. When the device 1000 is the information processing unit, the foregoing sending operation may be understood as an operation of sending a message or the first key through the transceiver 1120.

FIG. 12 is a schematic diagram of a structure of another device 1200 according to an embodiment of this application. The device 1200 may be a processing chip in the electronic control unit 220. In this case, the device 1200 includes a processor 1210 and an input/output interface. Alternatively, the device 1200 may be the electronic control unit 220. In this case, the device 1200 may include a transceiver 1220 and a memory 1230. For example, the processor 1210, the transceiver 1220, and the memory 1230 may be connected to each other through a bus 1240.

The processor 1210 in the device 1200 is configured to read related instructions to perform the following operations:

sending a first request message to an information processing unit, where the first request message includes an identifier of the electronic control unit;

receiving a first key sent by the information processing unit, where the first key is obtained by the information processing unit based on the identifier and security information of a first secure channel, and the first secure channel is used for communication between a cloud server and the information processing unit; and establishing a second secure channel with the cloud server based on the first key, where the second secure channel is used for communication between the cloud server and the electronic control unit.

For specific implementations of a plurality of operations performed by the foregoing device 1200, refer to specific operations of the electronic control unit in the foregoing method embodiments. Details are not described herein again.

This application provides a computer-readable storage medium. The computer-readable storage medium stores computer instructions, and the computer instructions instruct the server to perform the communication method provided in any one of the foregoing implementations.

It should be understood that, the processor mentioned in embodiments of this application may be a central processing unit (CPU), another general-purpose processor, a digital signal processor (DSP), an application-specific integrated circuit (ASIC), a field programmable gate array (FPGA), or another programmable logic device, a discrete gate or a transistor logic device, a discrete hardware component, or the like. The general-purpose processor may be a microprocessor, or the processor may be any conventional processor, or the like.

It may be further understood that the memory mentioned in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitation, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA, or another programmable logic device, discrete gate or transistor logic device, or discrete hardware component, the memory (a storage module) is integrated into the processor.

It should be noted that the memory described in this specification is intended to include but not limited to these memories and any memory of another appropriate type.

It should be further understood that "first", "second", "third", "fourth", and various numbers in this specification are merely used for differentiation for ease of description, and are not construed as a limitation to the scope of this application.

It should be noted that a term "and/or" describes an association relationship between associated objects and indicates that three relationships may exist. For example, A and/or B may indicate the following cases: Only A exists, both A and B exist, and only B exists. In addition, the character "/" in this specification usually indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

Persons of ordinary skill in the art may be aware that, units and algorithm steps in the examples described with reference to embodiments disclosed in this specification may be implemented by electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this application.

Persons skilled in the art may clearly understand that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate. Parts displayed as units may or may not be physical units, to be specific, may be located in one position, or may be distributed on a plurality of network units. Some or all of the units may be selected depending on actual requirements to achieve the objectives of the solutions in embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

A sequence of the steps of the method in embodiments of this application may be adjusted, combined, or deleted according to an actual requirement.

The modules in the apparatus in embodiments of this application may be combined, divided, or deleted according to an actual requirement.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A server, comprising at least one hardware processor and at least one memory, wherein the at least one memory is configured to store program instructions, and the at least one processor is coupled to the at least one memory and is configured to execute the instructions to:
   receive a first request message from a first apparatus through a first secure channel, wherein the first secure channel is used for communication between the server and the first apparatus, and wherein the first request message comprises an identifier of an electronic control unit of a vehicle;
   obtain a first key based on the identifier of the electronic control unit and security information of the first secure channel using a key derivation algorithm agreed on by the first apparatus and the server;
   establish a second secure channel with the electronic control unit based on the first key, wherein the second secure channel is a communication channel separate from the first secure channel; and
   implement communication between the server and the electronic control unit using the second secure channel.

2. The server according to claim 1, wherein the security information comprises at least one of the following information: a session key of the first secure channel, an identifier of the server, a session identifier of the first secure channel, and an identifier of the first apparatus.

3. The server according to claim 1, wherein the at least one processor is coupled to the at least one memory and is configured to execute the instructions to:
   generate a communication key based on the first key, wherein the communication key is used to encrypt data sent by the server to the electronic control unit or to decrypt data received from the electronic control unit.

4. The server according to claim 1, wherein the at least one processor is coupled to the at least one memory and is configured to execute the instructions to:
   verify a certificate of the first apparatus; and
   establish the first secure channel with the first apparatus based on the certificate being valid.

5. The server according to claim 1, wherein the at least one processor is coupled to the at least one memory and is configured to execute the instructions to:
- negotiate a session key with the first apparatus; and
- establish the first secure channel with the first apparatus based on the session key, wherein the session key is used to encrypt data sent to the first apparatus or to decrypt data received from the first apparatus.

6. The server according to claim 1, wherein the first apparatus is a telematics box or a vehicle gateway.

7. The server according to claim 1, wherein the electronic control unit is a vehicle control unit of the vehicle, a microcontroller unit of the vehicle, or a body control module of the vehicle.

8. A first apparatus, comprising at least one hardware processor and at least one memory, wherein the at least one memory is configured to store program instructions, and the at least one processor is coupled to the at least one memory and is configured to execute the instructions to:
- send a first request message to a cloud server through a first secure channel, wherein the first secure channel is used for communication between the cloud server and the first apparatus, and wherein the first request message comprises an identifier of an electronic control unit of a vehicle;
- obtain a first key based on the identifier of the electronic control unit and security information of the first secure channel using a key derivation algorithm agreed on by the first apparatus and the cloud server;
- send the first key to the electronic control unit, wherein the first key is used by the electronic control unit to establish a second secure channel with the cloud server, wherein the second secure channel is a communication channel separate from the first secure channel; and
- implement communication between the cloud server and the electronic control unit using the second secure channel.

9. The first apparatus according to claim 8, wherein the security information comprises a session key of the first secure channel.

10. The first apparatus according to claim 9, wherein the security information further comprises at least one of the following information: an identifier of the cloud server, a session identifier of the first secure channel, or an identifier of the first apparatus.

11. The first apparatus according to claim 8, wherein the at least one processor is coupled to the at least one memory and is configured to execute the instructions to:
- negotiate a session key with the cloud server; and
- establish the first secure channel with the cloud server based on the session key, wherein the session key is used to encrypt data sent to the cloud server or to decrypt data received from the cloud server.

12. The first apparatus according to claim 8, wherein the at least one processor is coupled to the at least one memory and is configured to execute the instructions to:
- verify a certificate of the cloud server; and
- establish the first secure channel with the cloud server based on the certificate being valid.

13. The first apparatus according to claim 8, wherein the first apparatus is a telematics box or a vehicle gateway.

14. The first apparatus according to claim 8, wherein the electronic control unit is a vehicle control unit of the vehicle, a microcontroller unit of the vehicle, or a body control module of the vehicle.

15. An electronic control unit, comprising at least one hardware processor and at least one memory, wherein the at least one memory is configured to store program instructions, and the at least one processor is coupled to the at least one memory and is configured to execute the instructions to:
- send a first request message to a first apparatus, wherein the first request message comprises an identifier of the electronic control unit;
- receive a first key from the first apparatus, wherein the first key is obtained based on the identifier of the electronic control unit and security information of a first secure channel using a key derivation algorithm agreed on by the first apparatus and a cloud server, and the first secure channel is used for communication between the cloud server and the first apparatus;
- establish a second secure channel with the cloud server based on the first key, wherein the second secure channel is a communication channel separate from the first secure channel; and
- implement communication between the cloud server and the electronic control unit using the second secure channel.

16. The electronic control unit according to claim 15, wherein the security information comprises a session key of the first secure channel.

17. The electronic control unit according to claim 16, wherein the security information further comprises at least one of the following information: an identifier of the cloud server, a session identifier of the first secure channel, or an identifier of the first apparatus.

18. The electronic control unit according to claim 15, wherein the at least one processor is coupled to the at least one memory and is configured to execute the instructions to:
- generate a communication key based on the first key, wherein the communication key is used to encrypt data sent to the cloud server or to decrypt data received from the cloud server.

19. The electronic control unit according to claim 15, wherein the first apparatus is a telematics box or a vehicle gateway.

20. The electronic control unit according to claim 15, wherein the electronic control unit is a vehicle control unit of the vehicle, a microcontroller unit of the vehicle, or a body control module of the vehicle.

* * * * *